United States Patent
Rogers et al.

(10) Patent No.: US 6,568,807 B2
(45) Date of Patent: May 27, 2003

(54) CONTACT LENS WITH MOULDED INVERSION MARK

(75) Inventors: Richard C. Rogers, Southampton (GB); Robert A. Broad, Southampton (GB); Gordon F. Maccabee, Southampton (GB); Stephen Williams, Southampton (GB)

(73) Assignee: Novartis AG, Basel (CH)

(*) Notice: Subject to any disclaimer, the term of this patent is extended or adjusted under 35 U.S.C. 154(b) by 147 days.

(21) Appl. No.: 09/865,063

(22) Filed: May 24, 2001

(65) Prior Publication Data

US 2002/0003605 A1 Jan. 10, 2002

Related U.S. Application Data

(60) Provisional application No. 60/207,113, filed on May 25, 2000.

(51) Int. Cl.[7] ............ G02C 7/04; B29D 11/00; G02B 1/12; B23K 26/00
(52) U.S. Cl. ............ 351/177; 351/162; 264/1.36; 264/2.5; 219/121.71
(58) Field of Search ............ 351/177, 160 R, 351/160 H, 162; 264/2.5, 1.36; 219/121.71

(56) References Cited

U.S. PATENT DOCUMENTS

| | | |
|---|---|---|
| 4,525,044 A | 6/1985 | Bauman |
| 4,939,354 A | 7/1990 | Priddy et al. |
| 4,976,533 A | 12/1990 | Hahn et al. |
| 5,053,609 A | 10/1991 | Priddy et al. |
| 5,061,342 A | 10/1991 | Jones |
| 5,062,701 A | 11/1991 | Drazba et al. |
| 5,124,536 A | 6/1992 | Priddy et al. |
| 5,170,191 A | 12/1992 | Jones |
| 5,240,553 A | 8/1993 | Jones |
| 5,257,706 A | 11/1993 | McIntyre |
| 5,331,131 A | 7/1994 | Opdyke |
| 5,359,173 A | 10/1994 | Opdyke |
| 5,378,582 A | 1/1995 | Chan |
| 5,396,045 A | 3/1995 | Opdyke |
| 5,498,508 A | 3/1996 | Chan |
| 5,641,437 A | 6/1997 | Williams et al. |
| 5,936,704 A | 8/1999 | Gabrielian et al. |
| 6,024,448 A * | 2/2000 | Wu et al. ............ 351/160 R |
| 6,042,230 A | 3/2000 | Needle et al. |
| 6,047,082 A | 4/2000 | Rhody et al. |
| 6,203,156 B1 * | 3/2001 | Wu et al. ............ 351/160 R |
| 2001/0013921 A1 * | 8/2001 | Wu et al. ............ 351/160 R |

FOREIGN PATENT DOCUMENTS

| | | |
|---|---|---|
| EP | 0 601 857 A1 | 6/1994 |
| EP | 0 947 872 A1 | 10/1999 |
| EP | 0 952 476 A1 | 10/1999 |
| WO | WO 98/28653 | 7/1998 |

OTHER PUBLICATIONS

European Search Report dated Aug. 10, 2001, for corresponding Application No. 01112630.7–2217.

Rizvi, Nadeem, "Microstructuring with Excimer Lasers," International Newsletter on Microsystems and Mems, mst-news 1/99, http://www.vdivde–it.de/mst.

* cited by examiner

*Primary Examiner*—Scott J. Sugarman
(74) *Attorney, Agent, or Firm*—Robert J. Gorman, Jr.; R. Scott Meece; Richard I. Gearhart

(57) ABSTRACT

A contact lens is provided that has visible inversion marks on the lens. The marks include a plurality of recessed spots having side walls, a substantially convex bottom surface, and a relatively shallow maximum depth of between about 7.5 microns and 12 microns. The recessed spots provide a highly visible marking indicia on a contact lens with maximum comfort to wear.

A method is also provided to make the inversion marks. The method includes projecting one or more laser beam pulses through a laser beam mask to etch an array of recessed spots in a surface of a contact lens mold insert and then scanning the insert and mask synchronously with respect to the laser beam pulses thereby forming the inversion mark on the mold insert. The mold insert is used to make casting cups for cast-molding contact lenses, through which the inversion marks are reproduced on the contact lenses.

25 Claims, 10 Drawing Sheets

(2 of 10 Drawing Sheet(s) Filed in Color)

CONTACT LENS WITH MOULDED INVERSION MARK

This application claims the benefit of U.S. Provisional Application No. 60/207,113, filed May 25, 2000.

BACKGROUND

This invention is related to a contact lens with visible marking indicia. More particularly, this invention is related to a contact lens with visible marking indicia created by a laser etching system, and methods for making the marks.

A variety of methods are known for placing marking indicia on contact lenses. These techniques generally involve either applying a mark directly on the contact lens, or for cast molded contact lenses, placing an inversion mark on the mold insert or molded casting cup so that the mark gets reproduced onto the lens-during the cast-molding process. Typically, the marking indicia is used to identify the source of the lens, to identify a specific orientation in an asymmetric lens, or to identify the front or back surface of a lens.

One such method for making an inversion mark involves the use of an electric discharge to burn the mark into a metal mold insert. The electrodes are shaped to correspond to the mark and placed in proximity to the mold insert where an electric discharge melts the mark in the surface of the insert. The size and shape of the letters in the mark are limited by the minimum 0.10 mm radius possible with wire-cut electrodes. The electric discharge can be a fire hazard and the equipment must have built in extinguishers.

Another method for making marks is to use a diamond point engraver to cut the mark into the surface of the mold insert. Some difficulties with this technique is that the depth of penetration is not uniform because of the difficulty aligning the arc of the cutter with the curved surface of the insert. Also, the profile of the mark is limited by the shape of the cutter.

Other techniques for placing indicia on contact lens, either directly or indirectly through marking the mold insert, include printing a visible mark on the lens, dyeing a visible mark on the lens, placing sphero-cylindrical optical marking elements on the lens, chemically etching the mark on the mold insert, and laser-writing a mark in the mold insert. Still, there is room for improvement for new marking techniques in terms of visibility, economics, wearer comfort, ease of manufacture, and manufacturing safety.

SUMMARY OF THE INVENTION

This invention is directed to an inversion mark on a cast molded contact lens, and a process for making that inversion mark. In one aspect of this invention, there is provided a contact lens having visible marking indicia on the lens. The marking indicia includes a plurality of recessed spots having side walls. The area of maximum depth of the recessed spots is generally proximate to the side walls around the perimeter of the spot. The recessed spots also include a substantially convex bottom surface. The convex bottom surface has a central surface area at a shallower depth than the maximum depth of the recessed spot.

In another aspect of the invention, there is provided a method of making a cast molded inversion mark in contact lenses. This method includes forming a plurality of recessed spots in a predetermined pattern in a metal mold insert. Preferably, the recessed spots have a substantially convex bottom surface. The method proceeds by injection molding thermoplastic casting cups with the mold inserts, and then casting a contact lens with the casting cups. By this process the recessed spots in the predetermined pattern in the mold insert are reproduced as raised spots on the casting cup, which are then reproduced as visible recessed spots in the predetermined pattern on the contact lens.

This invention further provides, in a third aspect, a method of making a cast molded inversion mark in a contact lens mold insert. The method includes the acts of providing a metal mold insert used for making contact lens casting cups, disposing over the insert a laser mask that has an array of holes. Then the method proceeds by projecting one or more laser beam pulses through the mask to etch recessed spots in the surface of the insert. The method further includes scanning the insert and mask synchronously with respect to the laser beam pulses thereby forming the inversion mark on the mold insert.

This invention has the advantage of providing a highly visible mark on a wet hydrogel contact lens that is visible when the lens is handled, and when worn on the eye, the mark may be seen easily by an eye-care professional. Moreover, no additional materials, such as inks or dyes, need to be added to the lens to enhance the visibility of the marks.

BRIEF DESCRIPTION OF THE DRAWINGS

The file of this patent contains at least one drawing executed in color. Copies of this patent with color drawings will be provided by the Patent and Trademark Office upon request and payment of the necessary fee.

FIGS. 1C and 1D depict magnified plan views of the inversion marks on the contact lens depicted in FIG. 1A.

DETAILED DESCRIPTION OF THE PREFERRED EMBODIMENTS

Figure 1A:
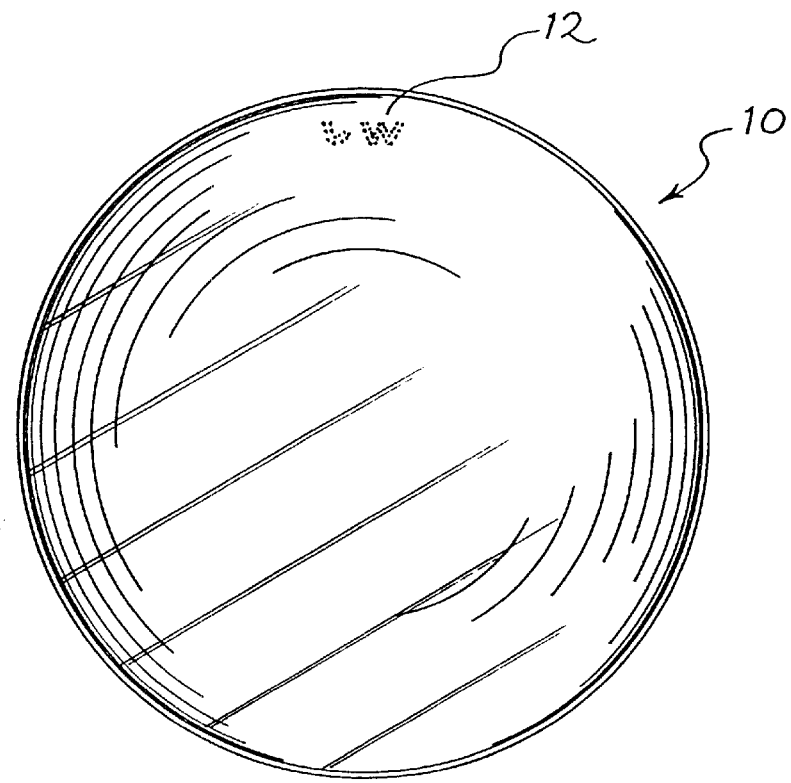
FIGS. 1A and 1B depict a plan view and side elevation view, respectively, of a contact lens having inversion marks located on the perimeter of the lens in accordance with the present invention.
Figure 1B:
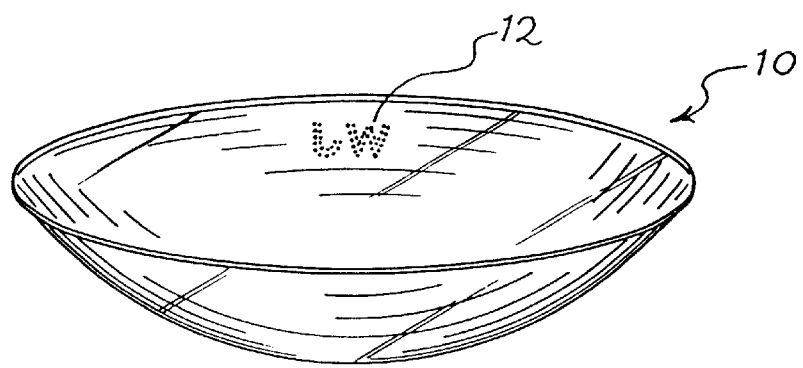

FIGS. 1A and 1B depict a contact lens 10 in accordance with one embodiment of the present invention. The contact lens includes visible inversion marks 12 located at the perimeter of the lens, preferably, on the front surface of the lens. These inversion marks are in the form of the letters "WJ" in reversed image cast molded in the lens. The letters "W" and "J" are made up of an array of recessed spots, or marks, in the lens. As will be apparent from the following description, these recessed spots are formed in the contact lens during the ordinary course of a conventional lens cast molding process.

Figure 1C:
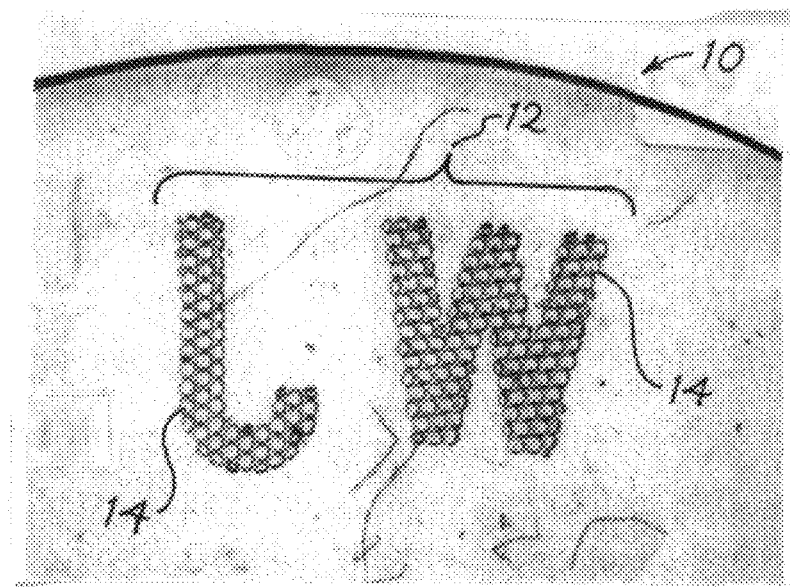

FIG. 1C depicts a magnified view of the inversion marks 12 shown on the contact lens 10 in FIG. 1A. The inversion mark comprises an array of recessed spots 14 arranged to form reversed letters "J" and "W". The letters on the contact lens have a height of about 2.0 mm. The group of the two letters have a combined width of about 3.5 mm.

FIG. 1D depicts a magnified view of the upper portion of the letter "J" shown in FIG. 1C. The individual recessed spots 14 are more visible in this view. The spots 14 are truncated along the line A—A forming the side of the letter "J". The edges have been truncated by the use of a two-layer mask—a first layer having an array of holes, and a second layer having an outline of the letter "J"—in the laser etching process that will be described below in connection with the process to make the lens of the present invention.

The contact lens cast molding process employed by the present invention is well known in the prior art. The preferred manufacturing process uses metal mold inserts. One pair of mold inserts may produce many thermoplastic injection molded casting cups, whereas each pair of casting cups is subsequently used only once to cast a single contact lens. In this process, the thermoplastic casting cups are injection molded in the metal insert molds. A pair of cups are joined in the course of the process to form a casting cavity. The casting cavity formed by joining casting cups is opened, then filled with monomer, and then closed. The monomer is then cured or polymerized to form a lens, which is removed from the casting cups and further processed to yield the final product, a soft hydrogel contact lens.

The casting cups may be manufactured from any thermoplastic material that is capable of being injection molded, and which provides the final cast lens with the required optical properties. The preferred materials for casting cups are polystyrene and polypropylene. To injection mold the casting cups, metal tool inserts of the required configuration are mounted in an injection molding machine, as is well known in the art. The injection molded casting cups are thereby made to be inverse reproductions of the metal mold inserts.

To make the contact lenses of the present invention, the inversion mark configurations are laser-etched onto the surface of the metal inserts. In the subsequent injection molding process to make the casting cups, the thermoplastic polymer material conforms to the shape and dimensions of the metal insert. Hence, the injection molded casting cups have a raised portion on their surface which conforms to the recessed spots in the metal mold insets. In the subsequent casting operation for the contact lenses, the reactive prepolymer dosed into the casting cup cavity conforms to the casting cup surface. Hence, after polymerization, the lens has recessed portion with a configuration that conforms to the raised portion on the casting cups, and replicates the recessed portion that was in the metal mold insert.

Figure 2:
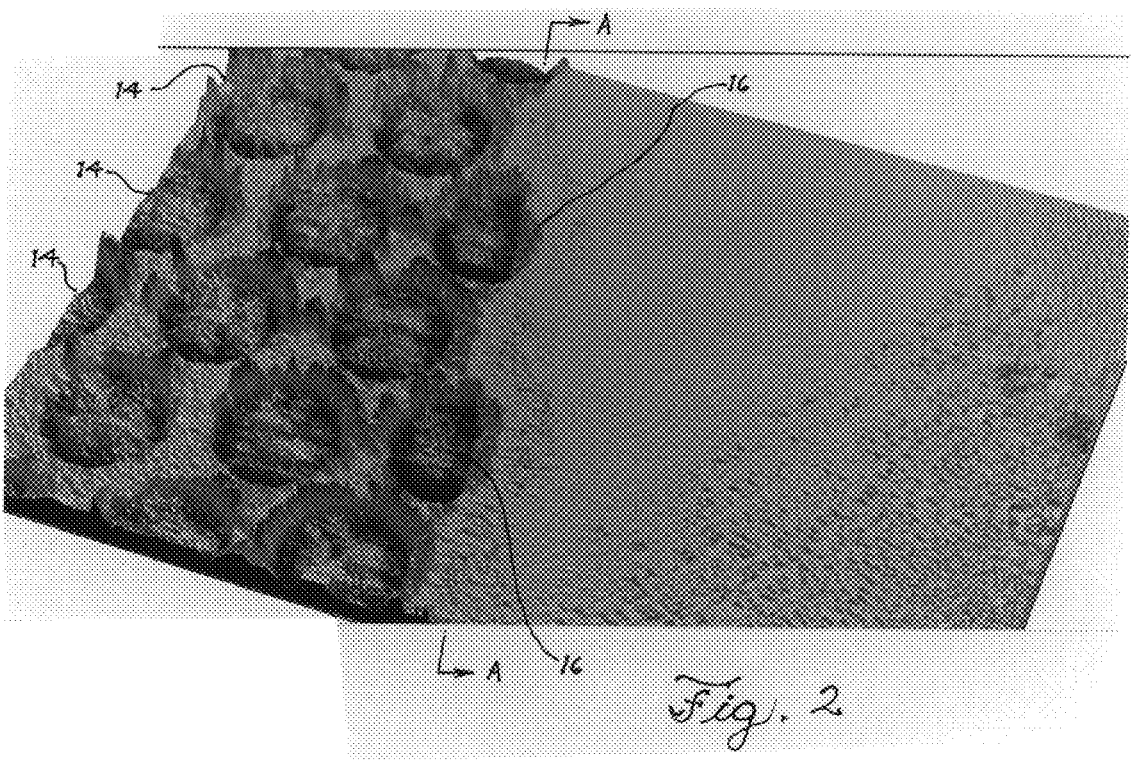
FIG. 2 depicts an interference microscope close up perspective image of an inversion mark on a mold insert.

FIG. 2 includes a reproduction of an interference microscope image of the recessed spots 14 that have been etched into the surface of the mold insert. The interference microscopic image was taken using an AG electro-optics interference microscope. This interference microscope is available from AG electro-Optics, Tarporly Cheshire, England. As may be seen, the recessed spots generally have a circular shape, with steep vertical side walls that penetrate into the mold insert to an area of the maximum depth of the spot. From the area of maximum depth moving radially inward, the bottom of the recessed spot rises to a generally convex bottom surface. The central area of that bottom surface is generally at a shallower depth than the maximum depth at the perimeter of the spot. As may be seen at the right edge of the array, the sides 16 of the recessed spots have been truncated by the edge of the mark outline along line A—A on a mask outline overlay that will be described later.

Figure 3:
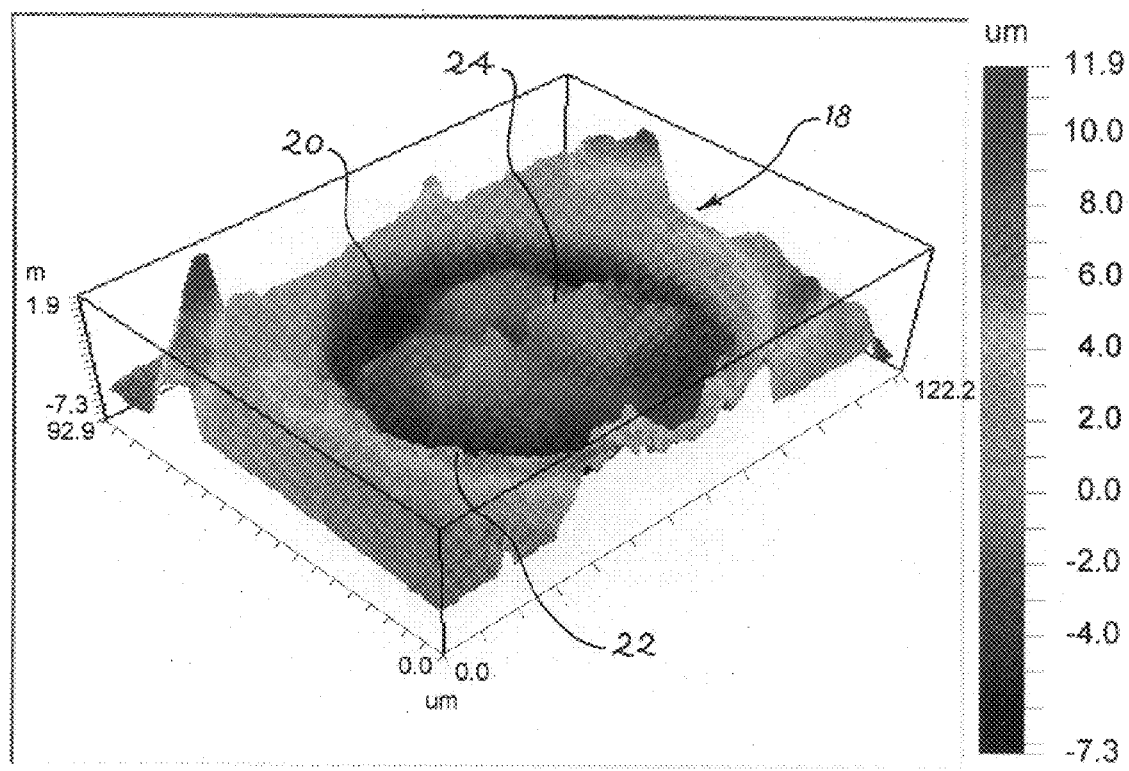
FIG. 3 depicts a computer enhanced perspective image of an individual recessed spot.

FIG. 3 depicts a three-dimensional plot of a representative recessed spot 18 in the surface of a mold insert. This recessed spot was measured by a WYKO MT200 Interference Microscope, and the image was analyzed using WYKO Vision 32 software. This plot shows the rough characteristics of a surface formed by the preferred method of this invention. Without intending to be held to this explanation, it is believed that one possible explanation for the surface profile depicted in FIG. 3 is that projecting laser light through each aperture in the mask concentrates the laser light rays around the perimeter of each projected spot. This creates a deeper depth 20 of the recessed spot around the perimeter of the spot. Diffraction and interference effects contribute to the surface roughness over the projected area of the letters. Some minor amounts of debris are built up around the edges 22 of the recessed spot in a crater-like fashion. The central area 24 of the recessed spot has a general upward thrust to create a substantially convex bottom surface. The upper most point of the bottom convex surface, however, is typically below the nominal surface of the metal insert.

Figure 4A:
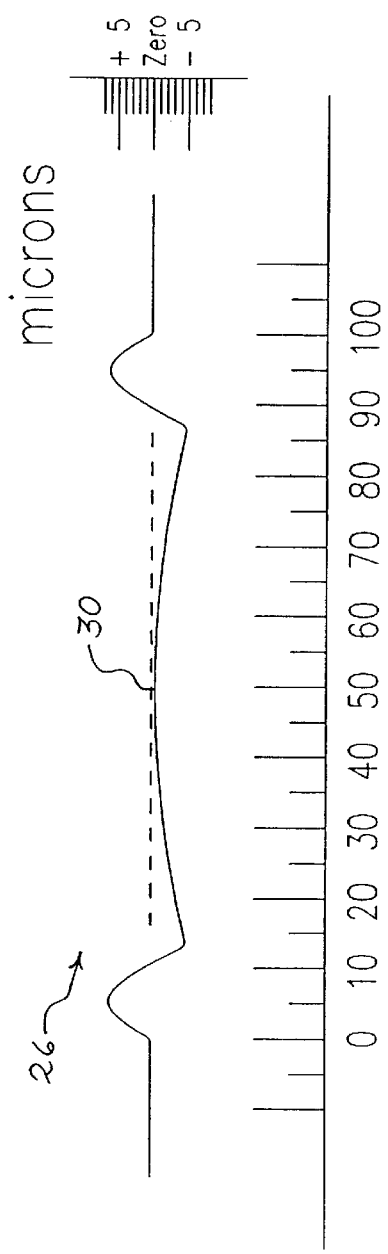
FIGS. 4A and 4B each depict a stylized profile of a recessed spot on a surface of a metal insert.
Figure 4B:
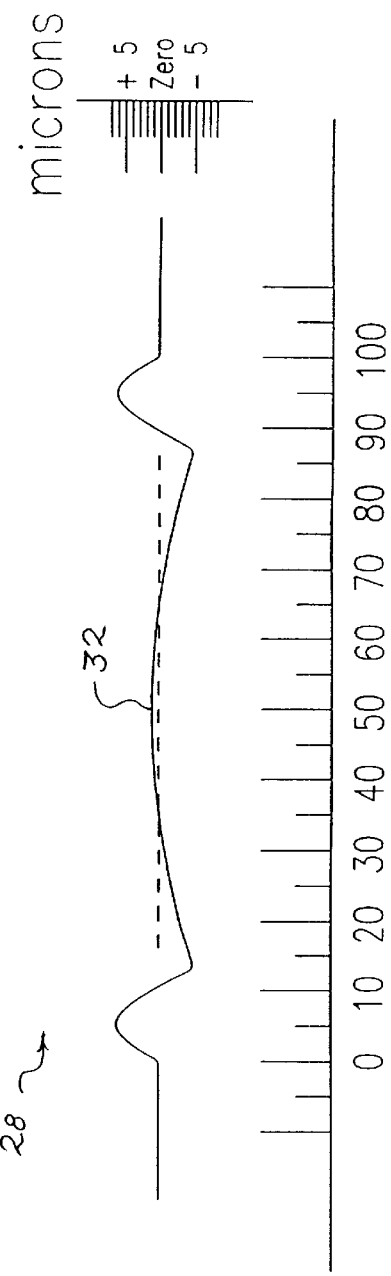

In contrast to the rough surface shown in FIG. 3, FIGS. 4A and 4B depict a stylized "smoothed" profile of recessed spots 26 and 28 on the surface of a mold insert. Though not accurate of a single recessed mark, the stylized profile is thought to be representative of a surface profile averaged over a large number of recessed spots. Under perfect conditions, this stylized profile would be the ideal achievement of a recessed spot within the scope of this invention. However, it is also intended that recessed spots with rough surfaces as shown in FIGS. 2 and 3 are also within the scope of the present invention. In FIG. 4A, the central area 30 of the bottom convex surface is below the surface of the metal mold insert, which is shown as a dotted line going through zero on the vertical scale. In FIG. 4B, the central area 32 of the bottom convex surface is above the surface of the metal mold insert. Whether the central area of the convex bottom surface is above or below the nominal surface of the metal mold insert is believed to be a random artifact of the method for making the mark. Accordingly, both embodiments are intended to be within the scope of the present invention. In both cases, the maximum depth of the recessed spot in the mold insert is less than 10 microns deep, and the bottom surface has a substantially convex profile. Preferably, the maximum depth is between about 5 microns and about 8 microns deep.

Since the inversion mark is reproduced onto a cast molded polymeric contact lens that is later subject to swelling into a hydrogel, the maximum depth of the recessed spot in the hydrated lens is believed to be more than the depth in the mold insert. For example, for a contact lens molded from netrafilcon material, the expected swelling due to hydration is about 46%. Thus, the preferred maximum depth of the spot in that lens would be expected to be between about 7.5 microns and about 12 microns below the nominal surface of the lens. Nevertheless, contact lenses may be made that do not swell, such as using "wet cast" zero swell polymers. For lenses made from these materials, the dimensions of the spots in the mold inserts would need to be modified to obtain dimensions in the final contact lens similar to that obtained in the swelled hydrogel lenses.

The preferred method of the present invention relies on the use of a laser beam system, such as an Excimer laser, YAG laser, or Titanium Sapphire lasers, to etch the recessed spots in the metal mold insert. Preferably, Excimer laser beam systems are used in connection with a mask and scanning techniques. Preferably, YAG laser beam systems are used in connection with a steered beam engraving technique. In the case of using an Excimer laser, the method makes use of the energy density distribution across the diameter of a circle of mask projected laser light. This means the cross-section profile of a recessed spot made by the circle of projected laser light on a metal mold insert is not flat. The circular spot has a cross section which is deeper at the perimeter and shallower in the center. Compared to other methods to make an inversion mark on a metal mold insert, this method is cheap and quick. There is no fire hazard from an electric discharge. There is no messy dielectric. There is no problem with alignment associated with micromachining or diamond engraving. The result of the unique cross section of the recessed spots is that the inversion mark is easily visible even though the recessed spots are only generally at a depth of about 8 microns (0.008 millimeters) in the mold insert.

The laser system preferably uses an Excimer UV pulsed laser operating at a wavelength of 248 nanometers. These lasers are part of a micro-machining system commercially available from Exitech Limited, which is located in Oxford, England, United Kingdom. These micro-machining systems are available under several model numbers: M2000, Series 7000 and Series 8000. These Excimer UV lasers are believed to operate by removing material from the mold insert through "ablation." The laser-beam pulses cut the surface layer of the target material into very small pieces, and then blasts the pieces away, hence the rough surface characteristics seen on the micrograph images of FIGS. 2 and 3. Since only a small proportion of the UV energy is converted to heat, there is no melt pool to smooth the surface. The fractured fragments of the target material are ejected upwards and outwards building up the crater-like edges around the perimeter of the recessed spot. It is believed that perhaps some of the debris may fall back into the center of the spot, or that more debris is ejected from the perimeter than the center, thereby contributing to a substantially convex bottom surface.

Figure 5:
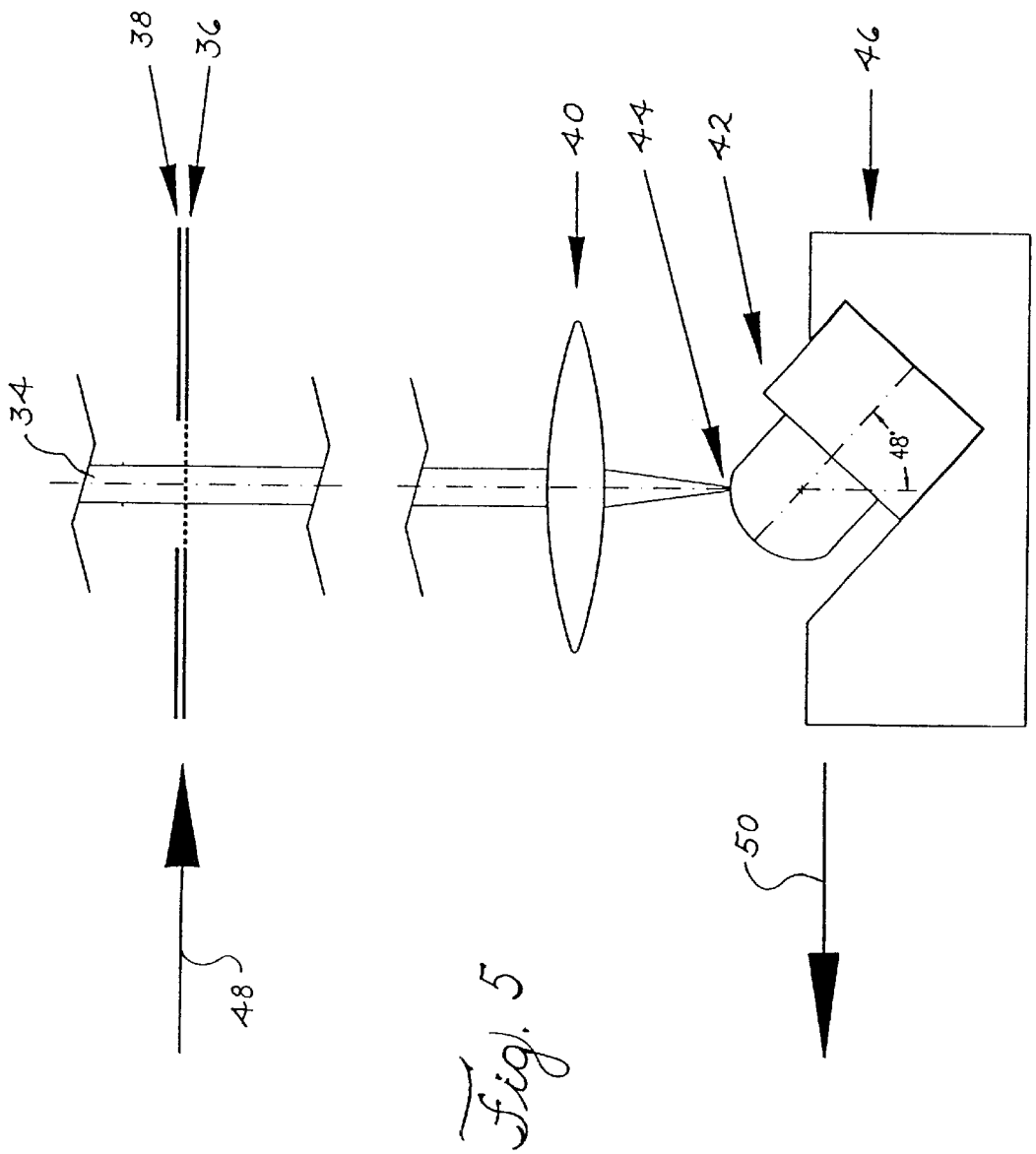
FIG. 5 depicts a laser etching system projecting a laser beam onto the surface of the mold insert.
Figure 6:
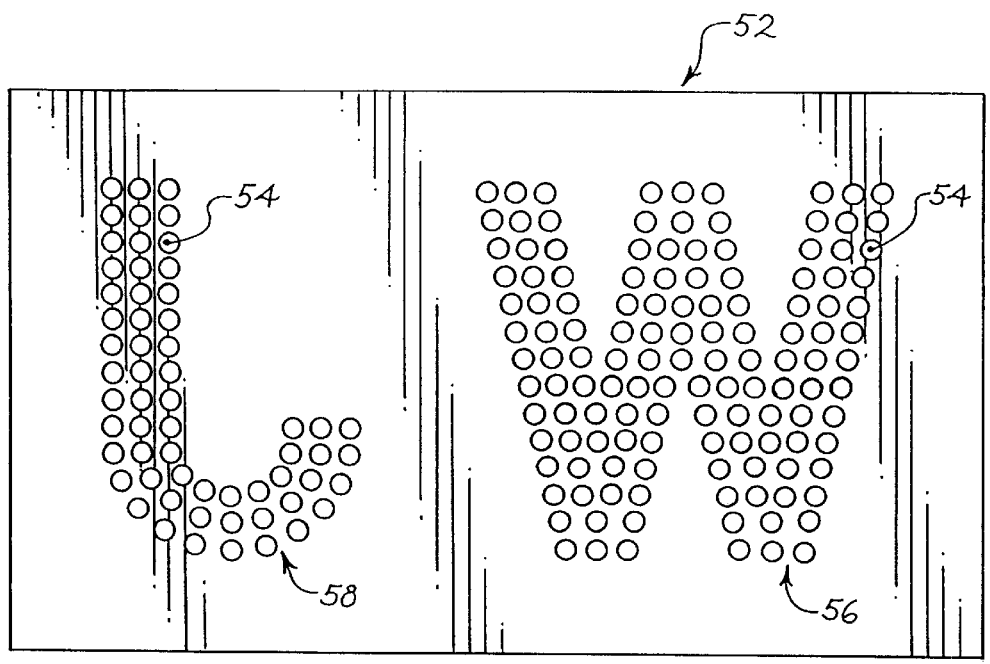
FIG. 6 depicts one embodiment of a laser mask for use in the method of this invention.

Referring to FIG. 5, a typical set-up of an Excimer UV laser beam system to etch a mold insert is shown. In operation, the laser beam 34 is not focused to a spot. Rather, the beam is preferably focused as a rectangle 20 millimeters by 4 millimeters across on to a mask 38. The laser beam 34 is emitted as a pulse from the source (not shown). The beam is homogenized, condensed and focused as a rectangular shape through the two layers 36 and 38 of a laser mask. For example, in the embodiment shown, the laser mask includes one layer 36 having an array of circular holes or apertures, and another layer 38 having the outline of the letters "W" and "J." Masks such as these are shown in more detail in FIGS. 7 and 8. Alternatively, a single layer mask may be used as shown in FIG. 6.

After passing through the mask, the laser beam is projected through a demagnification lens 40 that reduces the size of the laser beam by a factor of 10. With a 10 power demagnification, the lens 40 has a numerical aperture of 0.1. This reduction in size increases the energy density of the laser beam so that efficient machining of the metal insert can take place. In other words, the mask size is 10 times larger than the size of the marking indicia to be etched into the mold insert 42.

The laser beam is emitted in pulses and projected onto the surface 44 of the mold insert to etch away material in the form of an array of recessed spots. Depending on the energy of the laser beam, multiple laser beam pulses on the same area on the mold insert may be necessary to achieve the desired depth. During this laser etching process, an assist gas may be blown across the surface of the mold insert. The assist gas helps to remove the laser-ablated debris, and reduces the chance of a burr forming. Preferably, this assist gas is an inert gas such as nitrogen or helium. Alternatively, the mold insert may be placed under an inert gas blanket during laser etching.

Preferably, the laser beam is used to etch the female mold insert 44. The female mold insert is used to make the female casting cup. The female casting cup includes a surface that forms the front or anterior surface of the finished contact lens. Therefore, this process preferably creates the inversion marks on the front or anterior surface of the contact lenses, that is, the surface in contact with the inside of the eyelid of the wearer. This insert sits in a holder 46 that maintains the insert at a 48 degree angle with respect to the direction of the laser beam pulse. This presents the working surface of the mold insert at a perpendicular relationship to the laser beam. Preferably, reference marks are placed on the insert holder so that each metal insert may be placed in a repeatable, optimum position.

As the laser mask is substantially larger than the size of the laser beam, it is necessary to move the mask and the mold insert synchronously across the laser beam to provide a scanning of the laser beam across the surface of the mold insert. The laser beam and the lens systems remain in a fixed stationary position. The mask and the mold insert move synchronously in opposite directions 48 and 50, respectively, stepping in time with the laser beam pulses. In other words, the laser beam fires one or more 20 nanosecond pulses then the mask and insert step to a new position, then the laser fires again. The equipment to provide the scanning, that is, the synchronous movement of the mask and target, is typically an integral part of the laser system.

After the mark is etched into the surface of the mold insert, the insert may be polished to smooth or remove any burrs of raised material around the perimeter of each spot. Any known metal polishing techniques suitable for polishing a metal insert may be used. For example, a water-based diamond polishing compound may be used with polishing machine that rotates the metal insert against a cloth held on a reciprocating polishing dolly. Alternatively, the raised material may be removed by machining the material off. Another alternative is to make a deeper spot in the metal mold insert, for example 0.020 mm deep, and then machine off a 0.010 mm deep surface layer to achieve a spot with a depth of 0.010 mm relative to the new nominal surface of the insert.

FIG. 6 depicts one embodiment of a single-layer beam mask 52. This mask includes an array of holes or apertures 54 that are in a preselected pattern such as a reversed image of "W" 56 and "J" 58 letters. Preferably, each individual aperture 54 has a diameter of about 0.7 millimeters. The height of each individual letter on the mask is preferably about 13.0 millimeters. Preferably, the space in between hole centers, or the center-to-center distance, is about 0.95 millimeters. With a 10-power demagnification lens, the corresponding dimensions of the mark in the mold insert would be reduced by a factor of ten. Since the finished contact lens swells upon hydration after being cast and cured, the final dimensions of the spots and mark as the hydrated contact lens would be then increased by about the amount of swelling of the lens caused by hydration.

To increase the visibility of the final mark, the symbols of the mark are preferably made up of two, three or four recessed spots across the width of each line that makes up the portions of the symbols. More preferably, three recessed spots make up the width of the lines that make up the letters, numbers or symbols in the mark. Accordingly, for a line width of 0.25 mm on the mold insert, three spots each having a diameter of about 0.07 mm are aligned across the line to produce highly visible marks. Also, it is believed that spots organized in a regular arrangement, as opposed to a random placement, provides better results.

Figure 7:
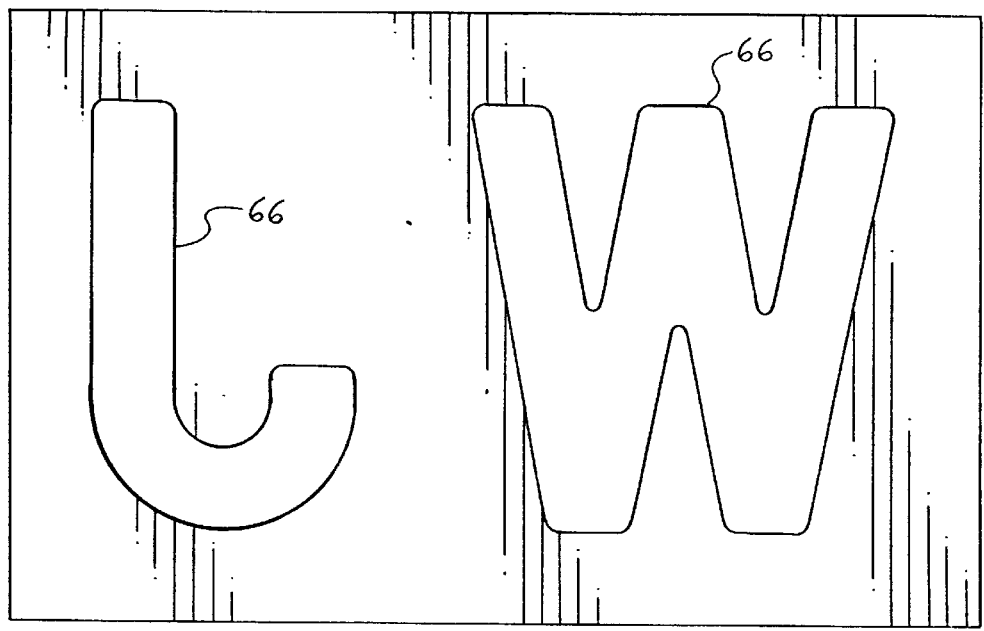
FIG. 7 and FIG. 8 depict two layers of a laser mask for use in the present invention.
Figure 8:
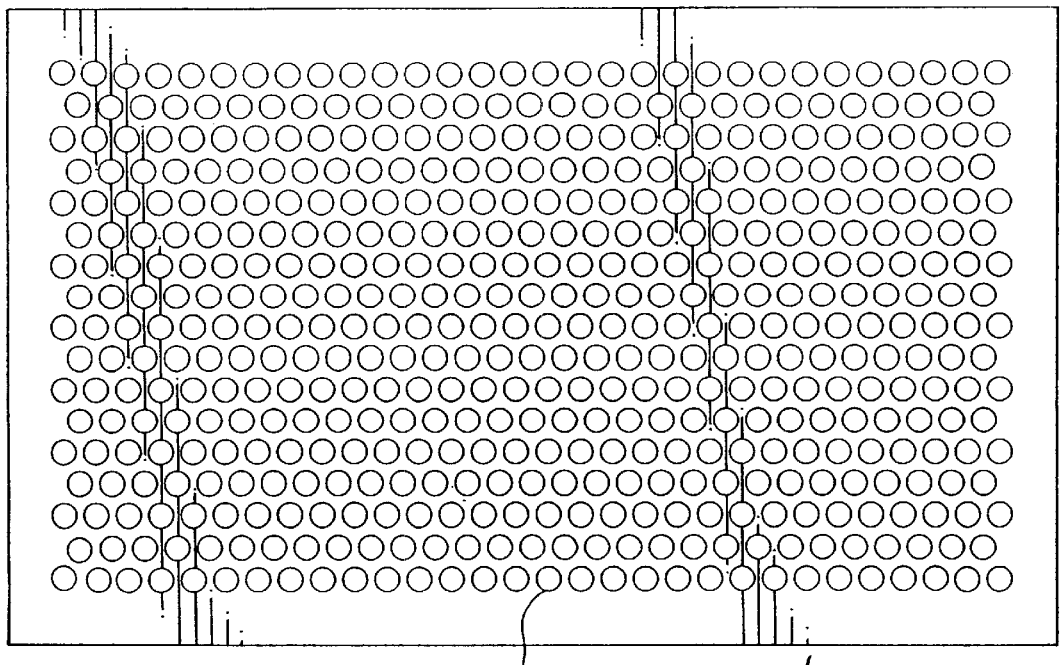

FIGS. 7 and 8 depict a second embodiment of a laser mask including a two-layer mask. One layer 60, shown in FIG. 8, is an array of regularly spaced apertures 62. The apertures preferably have a diameter of 0.7 millimeters. The aperture center-to-center distance is preferably about 0.9 millimeters. The second mask layer 64, as shown in FIG. 7, includes an outline 66 of the letters or other marking indicia cut into the mask. The outline layer overlaying the aperture array layer allows the laser beam to be projected only through those holes falling within the outline or boundary of the letters cut into the overlay layer of the mask. Thus, the outline of the letters may truncate the circumference of the apertures in the mask layer below. In this case, the truncated aperture provides a recessed spot in the surface of the mold insert similar to the truncated recessed spot seen in FIG. 2.

Preferably, the apertures in the mask have a circular shape, although other shapes may be used. When the laser beam is properly focused, the recessed spots will be made in the same shape as the shape of the apertures. When a circular aperture is in the mask, a circular spot is preferably formed. Nonetheless, when the laser beam is not properly focused, the shape of the spot may be slightly distorted. For example, with a circular aperture, it was found that an elliptical spot was formed when the laser beam was in the "above" focus position. When the laser beam was in the "below" focus position, an elliptical spot was formed with the long axis of the ellipse turning 90 degrees from the "above" focus position. One skilled in the art using this teaching may take advantage of this feature to alter the spots formed in the target.

Figure 9:
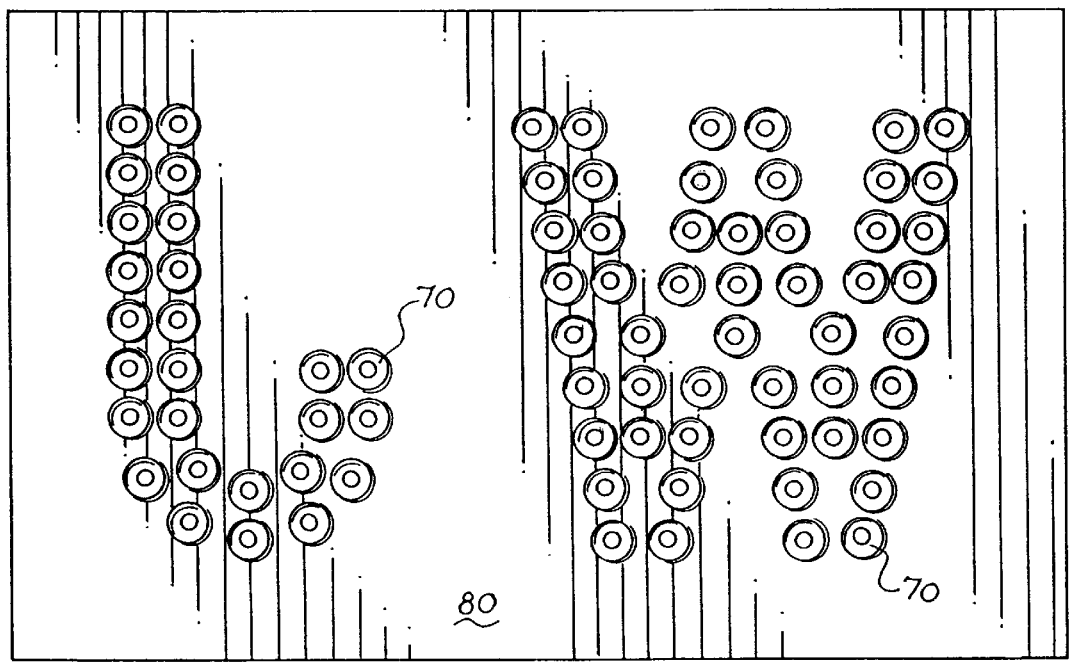
FIG. 9 depicts an alternative embodiment of an inversion mark pattern.
Figure 10:
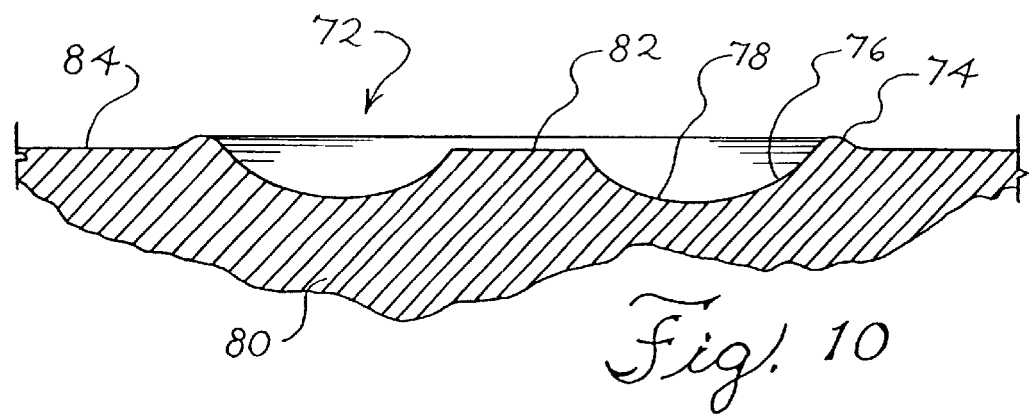

FIG. 9 depicts an alternative embodiment of an inversion mark pattern 68 on a metal mold insert 80. The inversion mark 68 is made up of a series of recessed spots 70 formed in the pattern of letters "W" and "J". Preferably, the spots have a diameter of about 0.10 mm and are spaced apart with a center-to-center distance of about 0.15 mm, which makes a line width of about 0.25 mm. These spots are preferably formed by using a steered-beam YAG laser to etch a spot by steering the laser beam in a small circle to draw a small donut-shaped recess, i.e., a portion of a toroidal surface, in the surface of a mold insert. It is preferred not to use a mask with the YAG laser, and instead to steer the laser beam to scribe each spot on the mold insert surface. The laser beam is steered by controlling the movement of two reflecting mirrors that direct the reflected laser beam onto the target surface. In contrast to an Excimer laser, the YAG laser fires preferably pulses in the kilohertz range. The YAG laser may also operate in a "continuous wave" mode. A typical YAG laser beam system that may be used is commercially available as a 65-watt power system under the model number HKR5 sold by Hahn and Kolb Technologies Ltd., Rugby, England.

Figure 10:
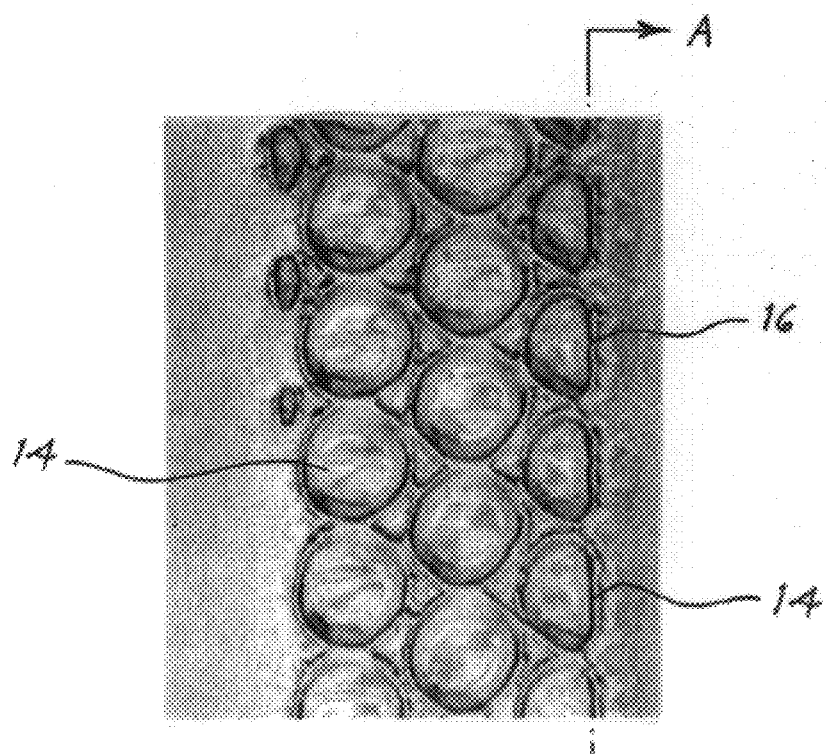
FIG. 10 depicts a stylized profile of an alternative embodiment of a recessed spot on a surface of a metal insert.

The stylized profile of such a recessed spot is depicted in FIG. 10. The recessed spot 72 has a raised edge 74 around its perimeter and a sloping side wall 76 penetrating to an area 78 of maximum depth in the mold insert 80. The maximum depth is preferably less than 10 microns. More preferably, the maximum depth is between about 5 microns and about 8 microns. The central area 82 including the bottom 78 of the recessed spot has a generally convex shape. The central area 82 is shown as being at the nominal surface 84 of the mold insert. If a narrow laser beam is used to etch a larger donut-shaped spot, the central area may be the nominal surface of the mold insert left untouched and circumscribed by the laser beam. If a wider beam is used, or the circle diameter is smaller, the central area may be etched below the nominal surface of the mold insert. Typically, the diameter of the portion of the central area 82 at the nominal surface may be about 0.039 mm. The full diameter of the spot 72 may be about 0.11 mm.

Figure 11:
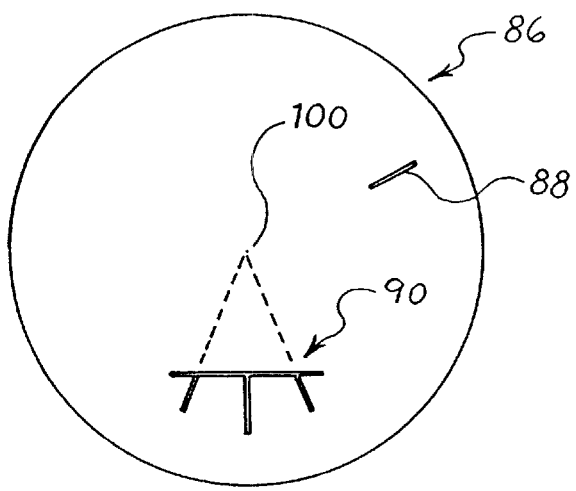
FIG. 11 depicts a plan view of a contact lens with an orientation mark and reference mark made in accordance with the invention.
Figure 12:
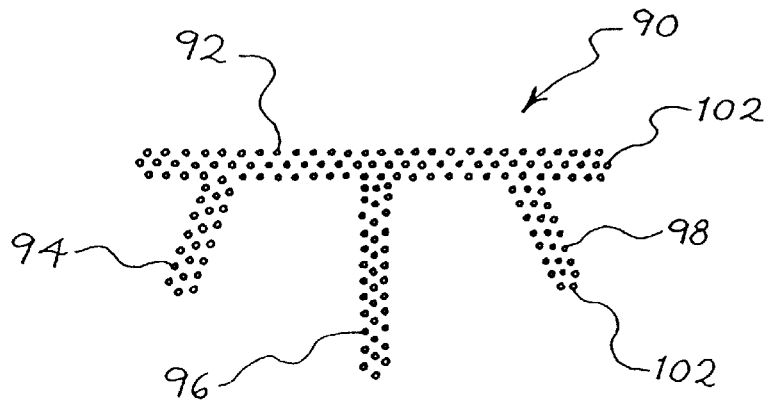
FIG. 12 depicts the close-up detail of the orientation mark of FIG. 11.

The actual surface of such a recessed spot is expected to be smoother than Excimer laser-etched spots, because YAG lasers characteristically tend to provide smoother etched surfaces in comparison to Excimer UV lasers. Nevertheless, there may be rough surfaces or ridges of built-up material across the width of the path of the steered laser beam FIG. 11 depicts a contact lens 86 with an orientation mark 90 and a reference mark 88 made in accordance with the present invention. The orientation mark 90 is useful to note the degree of offset that a ballasted contact lens is sitting on a patient's eye. The reference mark may be useful for indicating the direction of an astigmatic axis in a toric contact lens. Also, the reference mark may be useful for aligning a comparative reference for an automatic visual inspection system. FIG. 12 depicts a close-up detail of the orientation mark 90. The mark is made up of a horizontal line 92 and three radial lines 94, 96 and 98. The three radial lines are preferably 20 degrees apart aligning with the center 100 of the lens. Each line is made up of an array of recessed spots 102 in accordance with the present invention. U.S. Pat. No. 4,976,533 to Hahn et al. and U.S. Pat. No. 5,062,701 to Drazba et al., which are herein incorporated by reference, disclose printed orientation marking indicia that may be made in accordance with the present invention.

EXAMPLE

A Series 8000 Excimer Laser System available from Exitech, Ltd., Oxford, England, was used to create an inversion mark on a metal mold insert in the pattern of a "WJ". The laser was operated at a 248 nanometer wavelength with a 10 joule/cm$^2$ laser fluence. A two-layer mask as depicted in FIGS. 7 and 8 was made by chemically etching thin copper sheets. The mask was placed in the path of a 20 mm by 4 mm rectangular-shaped laser beam. A projection lens with a 10-power demagnification reduced the laser beam size below the mask. The laser beam was pulsed with a 20 nanosecond duration at a 20 Hz repetition. The mask and metal insert were synchronously scanned to provide 12 laser beam pulses per unit area of the mold insert. Assist gas of compressed air was blown across the surface of the metal insert during the laser etching process.

The resultant spots formed in this example are depicted in FIGS. 2 and 3, which were described above. It is believed that the pulse repetition, scan rate and laser fluence are key parameters since they combine to determine the total energy directed to each unit area of the metal insert. The depth of the recessed spot is believed to be proportional to the total energy absorbed by each unit area of the target. For example, it is believed that operating the laser system with a laser fluence of 6 joules/cm² and 30 pulses per unit area would provide the same results as this Example.

Using this metal mold insert, casting caps were molded and used to make hydrogel contact lenses according to known techniques. The contact lenses were made of netrafilcon material, which is a co-polymer of methyl methacrylate (MMA) and N,N-dimethyl acrylamide (DMA). The inversion marks were reproduced on the contact lenses. The lenses were hydrated to a water content of about 65 weight percent and accompanied by a 1.46 swell factor. The inversion marks were highly visible to an ordinary observer handling the lens. The marks could be seen within seconds of viewing the lens. The contact lenses were comfortable to wear and the inversion marks could not be felt by the wearer. The inversion marks were highly visible on the wearer's eyes when viewed using slit lamps.

The advantage of this invention is that it provides an inversion mark on a wet contact lens that is readily visible within seconds of a user placing the lens on their finger. Moreover, when the user places the lens on their eye they cannot feel the mark.

Although the inversion mark shown here includes a "WJ,"which provides indicia of the source of a lens being made by Westley-Jessen Corporation, other appropriate inversion marks may be used for any desirable marking indicia on a contact lens. For example, marking indicia may be provided for indicating whether a lens is for use in a left eye or the right eye. Also, orientation marks can be used on contact lenses to indicate the vertical axis or the asymmetric axis of a toric lens. Other marks may be provided that prove beneficial as reference marks for automated visual inspection systems, such as the one described by Rhody et al., U.S. Pat. No. 6,047,082, which is herein incorporated by reference.

The present invention may also be used to provide marking of the prescription information of the lens. However, because of the very small limited area available on the lens, it would not be practical or possible to include significant amounts of information on the lens. Accordingly, machine-readable codes, such as bar codes or dot matrices may be useful to provide significant information in a limited space. Dot Matrix, or data matrix, codes are a machine readable array of spots that represent information according to international standards, as adopted by the Semiconductor Equipment Manufacturer's Institute (SEMI) and other industry organizations. The data matrix codes and methods for reading them have been described by Priddy et al., in U.S. Pat. No. 4,939,354 which is herein incorporated by reference. Data matrix can contain more information in a smaller amount of space than bar codes, and thus are better suited than bar codes on mold inserts, casting cups and contact lenses.

Figure 13:
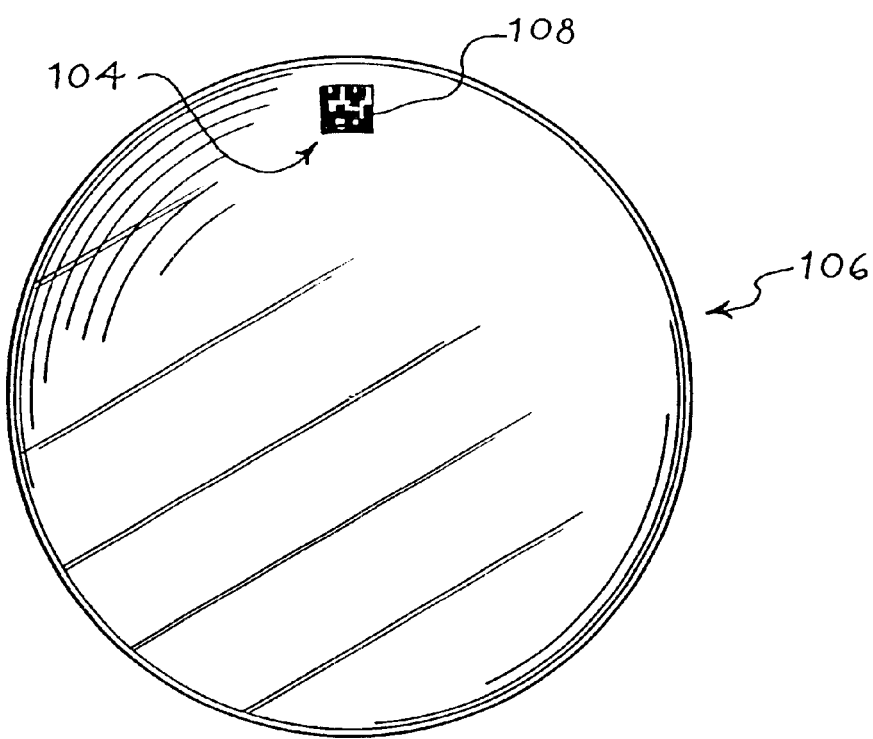
FIG. 13 depicts a plan view of a contact lens with a machine-readable information mark.

In this invention, the data matrix can be used to hold information such as contact lens prescription information, manufacturing location, etc. FIG. 13 depicts a data matrix 104 on a contact lens 106. The data matrix 104 is comprised of a seemingly random array of recessed spots 108 that are placed according to industry standards to represent the desired information. It can also be envisioned that the data matrix be etched into the part of the mold insert that defines the flange of the casting cup-to provide inventory information on the casting cup that would not be transferred to the contact lens.

Additionally, Fresnel "near field" diffraction patterns may be provided on a contact lens by changing the optics along the laser axis and the size and position of the mask.

Of course, it should be understood that changes and modifications can be made to the preferred embodiments described above without departing from the scope of the present invention. It is therefore intended that the foregoing detailed description be regarded as illustrative rather than limiting, and that it be understood that it is the appended claims, including all equivalents, which are intended to define the scope of the invention.

What is claimed is:

1. A contact lens having visible marking indicia on the lens, said marking indicia comprising a plurality of recessed spots, said spots having side walls, an area of maximum depth proximate to the side walls around the perimeter of the spot, and a substantially convex bottom surface, said convex bottom surface having a central area above the area of maximum depth.

2. The contact lens of claim 1, wherein said plurality of recessed spots are spaced in a array, the array being within a boundary corresponding to the shape of the marking indicia.

3. The contact lens of claim 2, wherein the boundary is selected from a letter, orientation mark, numeral, or machine-readable code.

4. The contact lens of claim 1, wherein the recessed spots have a maximum depth between about 7.5 microns and about 12 microns.

5. The contact lens of claim 1, wherein the recessed spots have a raised edge around the circumference of the mark projecting above a nominal surface of the contact lens.

6. The contact lens of claim 1, wherein the contact lens has a toric surface with an asymmetric axis, and said marking indicia is located on the lens in a position indicative of the asymmetric axis.

7. The contact lens of claim 1, wherein said side walls are substantially perpendicular to a proximate nominal surface of the lens.

8. The contact lens of claim 1, wherein said side walls are sloped with respect to a proximate nominal surface of the lens.

9. The contact lens of claim 1, wherein said marking indicia is indicative of an optical property of the lens.

10. A method of making an inversion mark comprising an array of recessed spots in a contact lens mold insert, the method comprising the acts of:
   a) providing a metal mold insert used for making contact lens casting cups;
   b) disposing a laser mask over the insert, the laser mask comprising an array of apertures;
   c) projecting one or more laser beam pulses through the apertures in the mask to etch the array of spots in the surface of the insert; and
   d) scanning the insert and mask synchronously with respect to the one or more laser beam pulses thereby forming the inversion mark on the mold insert.

11. The method of claim 10, wherein the laser mask further comprises a second mask overlaying the first mask, said second mask having at least one opening in the outline of a letter, number or orientation mark.

12. The method of claim 11, wherein the spots in the mold insert form an array having an outline corresponding to the outline in the second mask.

13. The method of claim 11, further comprising de-magnifying the laser beam pulses.

14. The method of claim 11, wherein the apertures in the laser mask have a diameter of about 0.7 mm.

15. The method of claim 11, wherein the spots in the mold insert have a depth between about 5 microns and about 8 microns.

16. The method of claim 11, wherein the number of pulses projected through an aperture corresponds to the depth of the spot formed thereby.

17. The method of claim 11, wherein the power of the pulses projected through an aperture corresponds to the depth of the spot formed thereby.

18. A method of making a visible mark in a molded contact lens, comprising:
   a) forming a mark comprising a plurality of recessed spots in a predetermined pattern in a metal mold insert, wherein the recessed spots have a substantially convex bottom surface;
   b) injection molding a thermoplastic casting cup with the mold insert, wherein the recessed spots in the mold insert are reproduced as raised spots on the casting cup; and
   c) casting a contact lens with said casting cup, thereby forming recessed spots in said predetermined pattern in the contact lens.

19. The method of claim 18, wherein the recessed spots in the insert are formed by laser-etching using an Excimer laser or a YAG laser.

20. The method of claim 18 wherein the recessed spots are formed by projecting a plurality of laser beam pulses through a mask having an array of holes in said predetermined pattern, the laser beam pulses etching the plurality of recessed spots in the mold insert.

21. The method of claim 18 wherein each recessed spot is formed by focusing a laser beam onto the mold insert, and steering the laser beam in a circle to form one recessed spot.

22. The method of claim 18 wherein the recessed spots have a shape that is at least one of substantially circular, or substantially circular with a truncated side.

23. A contact lens having visible marking indicia on the lens, said marking indicia comprising a plurality of toroidal depressions in the surface of the lens arranged in array to form the marking indicia.

24. The contact lens of claim 23 wherein the masking indicia comprises a letter, orientation mark, numeral, machine-readable code or combination thereof.

25. The contact lens of claim 23 wherein said depressions have a depth of less than 10 microns.

* * * * *